United States Patent
Moncur et al.

(10) Patent No.: US 11,053,163 B2
(45) Date of Patent: *Jul. 6, 2021

(54) TRANSPARENT HYDROPHOBIC MIXED OXIDE COATINGS AND METHODS

(71) Applicant: GKN Aerospace Transparency Systems, Inc., Garden Grove, CA (US)

(72) Inventors: Marlowe Moncur, Irvine, CA (US); Christopher Rankin, Orange, CA (US)

(73) Assignee: GKN Aerospace Transparency Systems, Inc., Garden Grove, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/730,913

(22) Filed: Dec. 30, 2019

(65) Prior Publication Data
US 2020/0255328 A1    Aug. 13, 2020

Related U.S. Application Data

(63) Continuation of application No. 15/681,140, filed on Aug. 18, 2017, now Pat. No. 10,519,063, which is a
(Continued)

(51) Int. Cl.
C03C 17/00    (2006.01)
C03C 17/32    (2006.01)
C03C 17/25    (2006.01)

(52) U.S. Cl.
CPC .......... C03C 17/007 (2013.01); C03C 17/008 (2013.01); C03C 17/009 (2013.01);
(Continued)

(58) Field of Classification Search
CPC ... C03C 17/007; C03C 17/008; C03C 17/009; C03C 17/25; C03C 17/324
See application file for complete search history.

(56) References Cited

U.S. PATENT DOCUMENTS

| | | |
|---|---|---|
| 4,599,270 A | 8/1986 | Rangaswamy et al. |
| 5,964,928 A | 10/1999 | Tomlinson |

(Continued)

FOREIGN PATENT DOCUMENTS

| | | |
|---|---|---|
| CN | 101062841 | 10/2007 |
| CN | 103080254 | 5/2013 |

(Continued)

OTHER PUBLICATIONS

Fuji et al, "Superhydrophobic hierarchical surfaces fabricated by anodizing of oblique angle deposited Al—Nb alloy columnar films", Applied Surface Science 257(2011) 8282-8288 (Year: 2011).

*Primary Examiner* — Nathan H Empie
(74) *Attorney, Agent, or Firm* — Sheppard, Mullin, Richter & Hampton LLP

(57) ABSTRACT

A hydrophobic coating and a method for applying such a coating to a surface of a substrate. The method includes applying a coating composition to the surface and heating the coated surface at a cure temperature from about 300° C. to about 600° C. for a time from about 2 hours to about 48 hours. The coating composition is applied to the surface by an application method selected from the group consisting of flowing, dipping, and spraying. The coating composition comprises a yttrium compound, an additive selected from the group consisting of a cerium compound and a dispersion of yttrium oxide nanoparticles, a water-soluble polymer, and a solvent solution of de-ionized water and a water-soluble alcohol.

16 Claims, 3 Drawing Sheets

Related U.S. Application Data continuation-in-part of application No. 15/242,372, filed on Aug. 19, 2016, now Pat. No. 10,059,623.

(52) U.S. Cl.
CPC .............. *C03C 17/25* (2013.01); *C03C 17/32* (2013.01); *C03C 17/324* (2013.01); *C03C 2217/228* (2013.01); *C03C 2217/242* (2013.01); *C03C 2217/45* (2013.01); *C03C 2217/475* (2013.01); *C03C 2217/76* (2013.01); *C03C 2218/111* (2013.01); *C03C 2218/112* (2013.01)

(56) References Cited

U.S. PATENT DOCUMENTS

| | | | |
|---|---|---|---|
| 10,059,623 B2* | 8/2018 | Moncur | C03C 17/008 |
| 10,519,063 B2* | 12/2019 | Moncur | C03C 17/324 |
| 10,533,256 B2* | 1/2020 | Rankin | C09D 7/65 |
| 2005/0008777 A1 | 1/2005 | McCleskey et al. | |
| 2010/0102464 A1 | 4/2010 | Hollingsworth et al. | |
| 2010/0105539 A1 | 4/2010 | Hollingsworth et al. | |
| 2013/0202895 A1* | 8/2013 | Arfsten | C08G 77/58 |
| | | | 428/446 |
| 2016/0032448 A1 | 2/2016 | Kim et al. | |
| 2019/0106794 A1 | 4/2019 | Rankin et al. | |

FOREIGN PATENT DOCUMENTS

| | | |
|---|---|---|
| CN | 103443043 | 12/2013 |
| CN | 104193409 | 12/2014 |
| WO | WO2007013640 | 2/2007 |

* cited by examiner

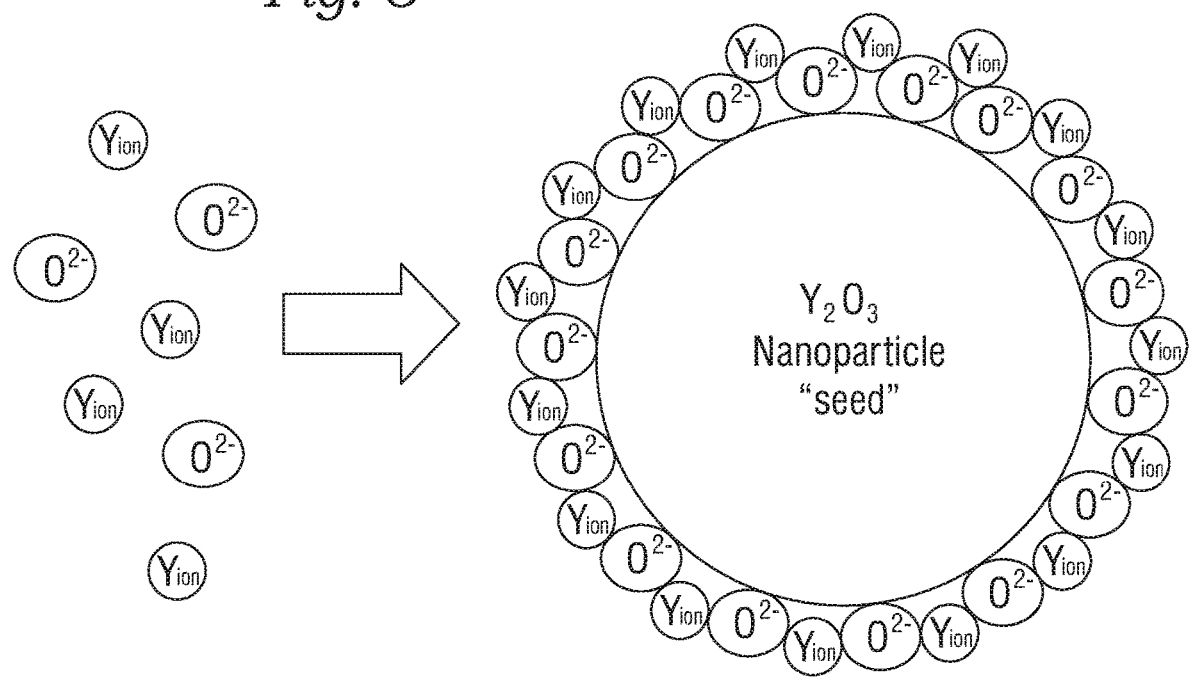

TRANSPARENT HYDROPHOBIC MIXED OXIDE COATINGS AND METHODS

CROSS-REFERENCE TO RELATED APPLICATIONS

This application is a continuation of U.S. patent application Ser. No. 15/681,140, filed on Aug. 18, 2017 and entitled "TRANSPARENT HYDROPHOBIC MIXED OXIDE COATINGS AND METHODS," which is a continuation-in-part of U.S. patent application Ser. No. 15/242,372, filed on Aug. 19, 2016 and entitled "TRANSPARENT HYDROPHOBIC MIXED OXIDE COATINGS AND METHODS," which is incorporated herein by reference in its entirety.

FIELD OF THE INVENTION

This invention relates generally to transparent, hydrophobic coatings and, more particularly, to a hydrophobic coating comprising rare-earth oxides and methods of applying such a coating to a surface of a substrate, such as glass.

BACKGROUND

Controlling the wetting properties of surfaces has been the subject of scientific investigation. Most existing hydrophobic surfaces rely on low surface energy polymers, such as fluoroalkylsilane, or patterned roughness at low length scales. Both strategies have significant drawbacks. For example, fluorinated polymers lack resistance to abrasion and are easily degraded by ultraviolet light. Similarly, high roughness coatings are often fragile and poorly suited for harsh environments. In addition, these coatings often rely on complex manufacturing techniques that are not easily scalable.

Aircraft, automotive, and other transparency applications provide additional challenges. For these applications, a hydrophobic coating should maintain high hardness, optical transparency, and resistance to attack by acids and bases. Moreover, because these applications often involve thermally and chemically tempered glass, which rapidly loses its strength at temperatures of 500° C. or higher, it is desirable to have a coating formulation having a cure temperature within the safe limits of glass substrate melting or de-tempering.

It should be appreciated that there is a need for a scalable method of applying an improved hydrophobic coating having environmentally robust hydrophobicity. The improved coating should be robust to environmental degradation, mechanical abrasion, and repeated stress, while exhibiting inherently low surface energy without additional surface patterning. For applications involving, for example, transparent, tempered glass, the coating should maintain hardness, optical transparency, and resistance to attack by acids and bases, while having a cure temperature within the safe limits of glass substrate melting or de-tempering. The present invention fulfills these needs and provides further related advantages.

BRIEF SUMMARY OF THE INVENTION

The present invention is embodied in a hydrophobic coating and a method of applying a hydrophobic coating to a surface of a substrate. In one embodiment, the method includes applying a coating composition to the surface and heating the coated surface at a cure temperature from about 300° C. to about 600° C. for a time from about 2 hours to about 48 hours. The coating composition is applied to the surface by an application method selected from the group consisting of flowing, dipping, and spraying. The coating composition comprises a yttrium compound, an additive selected from the group consisting of a cerium compound and a dispersion of yttrium oxide nanoparticles, a water-soluble polymer, and a solvent solution of de-ionized water and a water-soluble alcohol. Each feature or concept is independent, but can be combined with any other feature or concept disclosed in this application.

In one embodiment, the substrate is glass. In another embodiment, the glass is tempered, and may be both thermally and chemically tempered. In a further embodiment, the glass may be transparent. In yet another embodiment, the substrate is transparent tempered glass. Each feature or concept is independent, but can be combined with any other feature or concept disclosed in this application.

In one embodiment, the cure temperature is from about 450° C. to about 500° C. In another embodiment, the time may be from about 12 hours to about 24 hours. In a further embodiment, the cure temperature is about 450° C. and the time is about 24 hours. In a more detailed embodiment, the method further comprises the step of allowing the coating composition on the surface of the substrate to dry before heating. In an alternative embodiment, the method comprises the step of drying the coating composition on the surface of the substrate before heating. In yet another embodiment, the heating step may comprise ramping from a start temperature to the cure temperature at one or more ramp rates. Each feature or concept is independent, but can be combined with any other feature or concept disclosed in this application.

In one embodiment, the yttrium compound is selected from the group consisting of yttrium acetate, yttrium carbonate, yttrium chloride, yttrium fluoride, yttrium hydroxide, yttrium metal, yttrium nitrate, yttrium oxalate, and yttrium sulfate. In a further embodiment, the yttrium compound is yttrium acetate. Each feature or concept is independent, but can be combined with any other feature or concept disclosed in this application.

In one embodiment, the additive is a cerium compound. In an additional embodiment, the cerium compound is from about 18% to about 32% by weight of the cerium compound and yttrium acetate. In a further embodiment, the cerium compound is about 26% by weight of the cerium compound and yttrium acetate. In another embodiment, the cerium compound is from about 0.3% to about 0.6% by weight of the coating composition. In a further embodiment, the cerium compound is from about 0.4% to about 0.5% by weight of the coating composition. In one embodiment, the cerium compound is water-soluble. In another embodiment, the cerium compound is selected from the group consisting of cerium bromide, cerium chloride, and cerium nitrate. In a further embodiment, the cerium compound is sparingly water-soluble. In yet another embodiment, the cerium compound is selected from the group consisting of cerium acetate and cerium sulfate. Each feature or concept is independent, but can be combined with any other feature or concept disclosed in this application.

In one embodiment, the additive is the dispersion of yttrium oxide nanoparticles. In an additional embodiment, the dispersion of yttrium oxide nanoparticles is from about 0.1% to about 5% by weight of the coating composition. In a further embodiment, the dispersion of yttrium oxide nanoparticles is from about 0.5% to about 1% by weight of the coating composition. In one embodiment, the cure temperature is from about 300° C. to about 500° C. In a further embodiment, the cure temperature is from about 300° C. to about 400° C. In one embodiment, the cure time may be from about 2 hours to about 5 hours. In a further embodiment, the cure time may be from about 2 hours to about 4 hours. In a further preferred embodiment, the cure temperature may be about 300° C. and the time may be about 2 hours. Each feature or concept is independent, but can be combined with any other feature or concept disclosed in this application.

In one embodiment, the water-soluble polymer is selected from the group consisting of poly(n-vinylpyrrolidone), poly (vinylamine) hydrochloride, polymethacrylamide, polyvinyl alcohol, polyacrylamide, poly(ethylene oxide-b-propylene oxide), poly(methacrylic acid), poly(ethylene oxide), poly (n-iso-propylacrylamide), and poly(2-vinylpyridine). In another embodiment, the water-soluble polymer is polyvinyl alcohol. In yet another embodiment, the water-soluble polymer is from about 1% to about 10% by weight of the coating composition. In a further embodiment, the water-soluble polymer is from about 1% to about 5% by weight of the coating composition. Each feature or concept is independent, but can be combined with any other feature or concept disclosed in this application.

In one embodiment, the water-soluble alcohol is selected from the group consisting of isopropyl alcohol, methanol, ethanol, propanol, and butanol. In another embodiment, the water-soluble alcohol is isopropyl alcohol. In a further embodiment, the de-ionized water and water-soluble alcohol are present in the solvent solution in a ratio of about 2:1. Each feature or concept is independent, but can be combined with any other feature or concept disclosed in this application.

A more detailed example is embodied in a method of applying a hydrophobic coating to a glass surface. In one embodiment, the method includes applying a coating composition to the surface and heating the coated surface at a cure temperature from about 450° C. to about 600° C. for a time from about 12 hours to about 48 hours. The coating composition is applied to the surface by an application method selected from the group consisting of flowing, dipping, and spraying. The coating composition comprises a yttrium compound, a cerium compound, a water-soluble polymer, and a solvent solution of de-ionized water and a water-soluble alcohol. The cerium compound is from about 0.3% to about 0.6% by weight of the coating composition, the water-soluble polymer is from about 1% to about 5% by weight of the coating composition; and the de-ionized water and water-soluble alcohol are present in the solvent solution in a ratio of about 2:1. Each feature or concept is independent, but can be combined with any other feature or concept disclosed in this application.

In other embodiments, the yttrium compound is selected from the group consisting of yttrium acetate, yttrium carbonate, yttrium chloride, yttrium fluoride, yttrium hydroxide, yttrium metal, yttrium nitrate, yttrium oxalate, and yttrium sulfate; the cerium compound is selected from the group consisting of cerium acetate, cerium bromide, cerium chloride, cerium nitrate, and cerium sulfate; the water-soluble polymer is selected from the group consisting of poly(n-vinylpyrrolidone), poly(vinylamine) hydrochloride, polymethacrylamide, polyvinyl alcohol, polyacrylamide, poly(ethylene oxide-b-propylene oxide), poly(methacrylic acid), poly(ethylene oxide), poly(n-iso-propylacrylamide), and poly(2-vinylpyridine); and the water-soluble alcohol is selected from the group consisting of isopropyl alcohol, methanol, ethanol, propanol, and butanol. Each feature or concept is independent, but can be combined with any other feature or concept disclosed in this application.

In further embodiments, the yttrium compound is yttrium acetate, the cerium compound is cerium chloride, the water-soluble polymer is polyvinyl alcohol, the water-soluble alcohol is isopropyl alcohol, and the cure temperature is about 450° C. and the time is about 24 hours. Each feature or concept is independent, but can be combined with any other feature or concept disclosed in this application.

Another more detailed example is embodied in a method of applying a hydrophobic coating to a glass surface. In one embodiment, the method includes applying a coating composition to the surface and heating the coated surface at a cure temperature from about 300° C. to about 400° C. for a time from about 2 hours to about 4 hours. The coating composition is applied to the surface by an application method selected from the group consisting of flowing, dipping, and spraying. The coating composition comprises a yttrium compound, a dispersion of yttrium oxide nanoparticles, a water-soluble polymer, and a solvent solution of de-ionized water and a water-soluble alcohol. The dispersion of yttrium oxide nanoparticles is about 0.5% to about 1% by weight of the coating composition, the water-soluble polymer is from about 1% to about 5% by weight of the coating composition; and the de-ionized water and water-soluble alcohol are present in the solvent solution in a ratio of about 2:1. Each feature or concept is independent, but can be combined with any other feature or concept disclosed in this application.

In other embodiments, the yttrium compound is selected from the group consisting of yttrium acetate, yttrium carbonate, yttrium chloride, yttrium fluoride, yttrium hydroxide, yttrium metal, yttrium nitrate, yttrium oxalate, and yttrium sulfate; the water-soluble polymer is selected from the group consisting of poly(n-vinylpyrrolidone), poly(vinylamine) hydrochloride, polymethacrylamide, polyvinyl alcohol, polyacrylamide, poly(ethylene oxide-b-propylene oxide), poly(methacrylic acid), poly(ethylene oxide), poly(n-iso-propylacrylamide), and poly(2-vinylpyridine); and the water-soluble alcohol is selected from the group consisting of isopropyl alcohol, methanol, ethanol, propanol, and butanol. Each feature or concept is independent, but can be combined with any other feature or concept disclosed in this application.

In further embodiments, the yttrium compound is yttrium acetate, the water-soluble polymer is polyvinyl alcohol, the water-soluble alcohol is isopropyl alcohol, and the cure temperature is about 300° C. and the time is about 2 hours. Each feature or concept is independent, but can be combined with any other feature or concept disclosed in this application.

Other features and advantages of the invention should become apparent from the following description of the preferred embodiments, taken in conjunction with the accompanying drawings, which illustrate, by way of example, the principles of the invention.

BRIEF DESCRIPTION OF THE DRAWINGS

FIG. 3 is an illustration of a nanoparticle "seeding" process for reducing the cure temperature in accordance with one embodiment.

DETAILED DESCRIPTION OF THE PREFERRED EMBODIMENTS

Figure 1A:
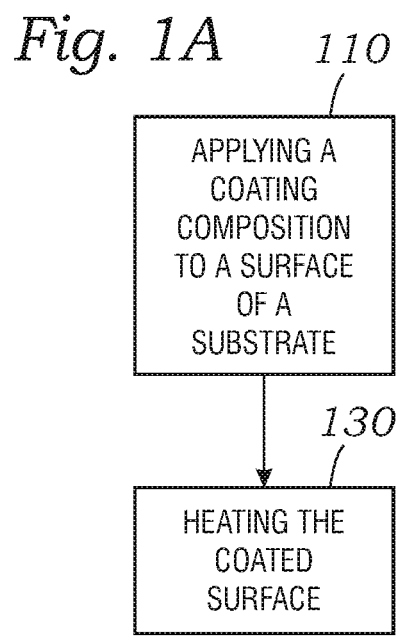
FIGS. 1A-1C are flow diagrams showing a method of applying a hydrophobic coating in accordance with some embodiments.
Figure 1B:
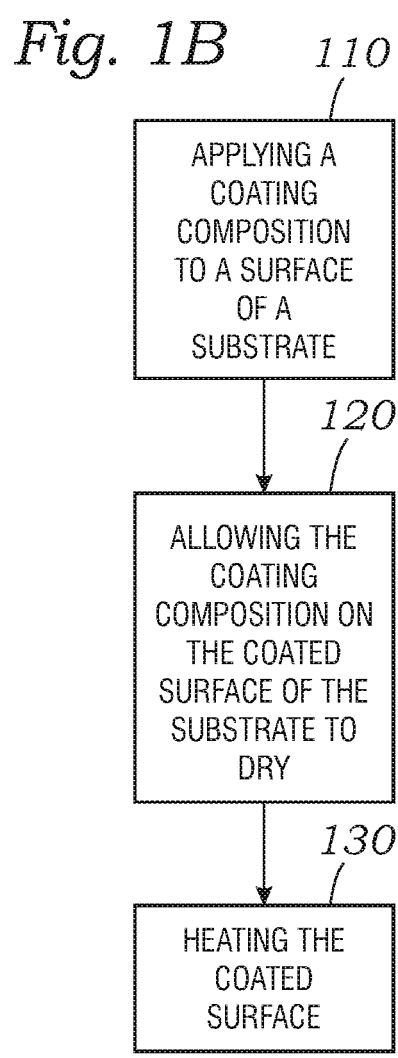
Figure 1C:
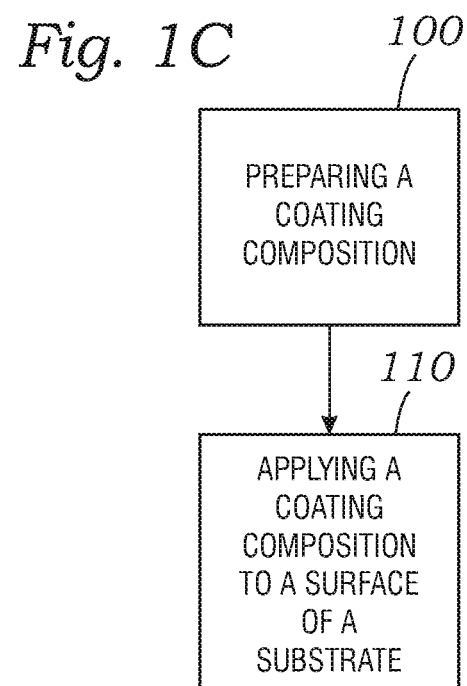

With reference now to FIGS. 1A-1C of the illustrative drawings, there is shown methods of applying a hydrophobic coating to a surface of a substrate in accordance with embodiments of the invention. In one embodiment, the method includes the step 110 of applying a coating composition to the surface and a step 130 of heating the coated surface. In certain embodiments, the coated surface can be heated at a cure temperature from about 450° C. to about 600° C. for a time from about 8 hours to around 48 hours. In other embodiments, as will be described in greater detail below, a cure temperature of about 300° C. to about 500° C. for a time from about 2 hours to 5 hours can be achieved. The coating composition is applied by an application method selected from the group consisting of flowing, dipping, and spraying. The coating composition comprises a yttrium compound; an additive selected from the group consisting of a cerium compound and a dispersion of yttrium oxide nanoparticles; a water-soluble polymer; and a solvent solution of de-ionized water and a water-soluble alcohol. Each feature or concept is independent, but can be combined with any other feature or concept disclosed in this application.

In some embodiments, the resulting hydrophobic coating will exhibit water-contact angles greater than about 90°, greater than about 95°, greater than about 100°, or greater than about 105°. The hydrophobic coating will have a thickness of over about 50 nm, over about 75 nm, over about 100 nm, over about 125 nm, over about 150 nm, over about 200 nm, over about 225 nm, or over about 250 nm. In addition, the hydrophobic coating will be robust to environmental degradation, mechanical abrasion, and repeated stress. For example, in some embodiments, the hydrophobic coating will exhibit high hardness, optical transparency, and resistance to attack by acids and bases.

Another advantage of this method is that the cure temperature is within the safe limits of glass substrate melting and, in some embodiments, de-tempering. Accordingly, this method is appropriate for applying a hydrophobic coating to a surface of, for example, a glass substrate, which may be thermally tempered, chemically tempered, or both.

Many of these beneficial features result, in part, from the combination of a yttrium compound and an additive of a cerium compound or a dispersion of yttrium oxide nanoparticles.

Yttrium, by itself, exhibits high hardness, optical transparency, and resistance to attack by acids and bases. However, yttrium displays only moderate hydrophobicity, with a maximum water contact angle of about 85°, even when subjected to high temperature extended cure conditions. In addition, yttrium has high melting and crystallization temperatures, which generally exceed the safe limits of glass substrate melting or de-tempering.

Cerium crystallizes at a temperature of around 200° C. to around 400° C., which is within the safe limits of glass substrate melting or de-tempering. However, like yttrium, cerium displays only moderate hydrophobicity, with a maximum water contact angle of 85°, even when subjected to high temperature extended cure conditions. In addition, cerium, by itself, exhibits a reddish color that is undesirable for transparency applications.

Surprisingly, a coating composition comprising a combination of a yttrium compound and a cerium compound will result in a mixed system, which has yttrium's preferred optical qualities and cerium's reduced crystallization temperature. The addition of the cerium compound into the yttrium lattice promotes atomic mobility and a drive toward crystallization at lower temperatures. This combination further increases hydrophobicity, with water contact angles greater than about 90°, greater than about 95°, greater than about 100°, or about 105°.

Similar results are attained by a coating composition comprising a combination of a yttrium compound and a dispersion of yttrium oxide nanoparticles, which, in one embodiment, possess the same crystal structure of the cured hydrophobic coating. With reference to FIG. 3, these yttrium oxide nanoparticles promote nucleation and crystal growth of the hydrophobic phase of interest and further suppress the necessary cure temperature. As the coating composition is heated, the yttrium oxide nanoparticles act as "seeds" for the developing yttrium oxide crystals. In other words, with the dispersion of yttrium oxide nanoparticles, yttrium and oxygen ions in the solution can easily find sites on the nanoparticles and create further layers of hydrophobic crystalline material. Without the nanoparticle seeds, the dissolved ions would face a nucleation barrier that can only be overcome through the addition of thermal energy and increased cure temperature. Thus, the dispersion of yttrium oxide nanoparticles effectively lowers the barrier for nucleation, allowing crystallization to occur at reduced temperatures compared to pure yttrium. In certain embodiments, a coating composition comprising a combination of yttrium compound and a dispersion of yttrium oxide nanoparticles can achieve significantly lower cure temperatures and cure times than would typically be expected. For example, in various embodiments, the cure temperature to crystallize the coating composition may be between approximately 300° C. to 500° C. and the cure time is between approximately 2 to 5 hours. In a more particular embodiment, the cure temperature is between approximately 300° C. and 400° C. and the cure time is between approximately 2 to 3 hours. In an even more particular embodiment, the cure temperature is approximately 300° C. and the cure time is approximately 2 hours. Each feature or concept is independent, but can be combined with any other feature or concept disclosed in this application.

Accordingly, in one embodiment, the coating composition comprises a yttrium compound and an additive of a cerium compound or a dispersion of yttrium oxide nanoparticles. In another embodiment, the coating composition comprises a yttrium compound and an additive of both a cerium compound and a dispersion of yttrium oxide nanoparticles.

The table below provides chemical formulas for the yttrium-based chemical reagents available for sol-gel synthesis. In one embodiment, the yttrium is selected from the group consisting of yttrium acetate, yttrium carbonate, yttrium chloride, yttrium fluoride, yttrium hydroxide, yttrium metal, yttrium nitrate, yttrium oxalate, and yttrium sulfate. In a preferred embodiment, the yttrium is yttrium acetate.

| Yttrium Compound | Formula |
| --- | --- |
| Yttrium Acetate | $Y(C_2H_3O_2)_3 \cdot H_2O$ |
| Yttrium Carbonate | $Y_2(CO_3)_3 \cdot H_2O$ |
| Yttrium Chloride | $YCl_3 \cdot (H_2O)_6$ |
| Yttrium Fluoride | $YF_3$ |

-continued

| Yttrium Compound | Formula |
|---|---|
| Yttrium Hydroxide | $Y(OH)_3 \cdot H_2O$ |
| Yttrium Metal | $Y$ |
| Yttrium Nitrate | $Y(NO_3)_3 \cdot H_2O$ |
| Yttrium Oxalate | $Y_2(C_2O_4)_3 \cdot H_2O$ |
| Yttrium Sulfate | $Y_2(SO_4)_3 \cdot (H_2O)_8$ |

In some embodiments, the coating composition comprises an additive of a cerium compound. In one embodiment, the cerium compound is from about 18% to about 32% by weight of the cerium compound and yttrium acetate. In another embodiment, the amount of cerium compound is about 26% by weight of the cerium compound and yttrium acetate. In a further embodiment, the cerium compound is from about 0.3% to about 0.6% by weight of the coating composition. In an additional embodiment, the cerium compound is from about 0.4% to about 0.5% by weight of the coating composition. In one embodiment, the cerium compound is water-soluble. Examples of water-soluble cerium compounds include cerium bromide, cerium chloride, and cerium nitrate. In another embodiment, the cerium compound is sparingly water-soluble. Examples of sparingly water-soluble cerium compounds include cerium acetate and cerium sulfate. Each feature or concept is independent, but can be combined with any other feature or concept disclosed in this application.

In other embodiments, the coating composition comprises an additive of a dispersion of yttrium oxide nanoparticles. The dispersion of yttrium oxide nanoparticles is preferably compatible with the coating composition and can therefore be added at high levels without precipitation. In one embodiment, the dispersion of yttrium oxide nanoparticles is from about 0.1% to about 5% by weight of the coating composition. In a preferred embodiment, the dispersion of yttrium oxide nanoparticles is from about 0.5% to about 1% by weight of the coating composition. Each feature or concept is independent, but can be combined with any other feature or concept disclosed in this application.

Figure 2A:
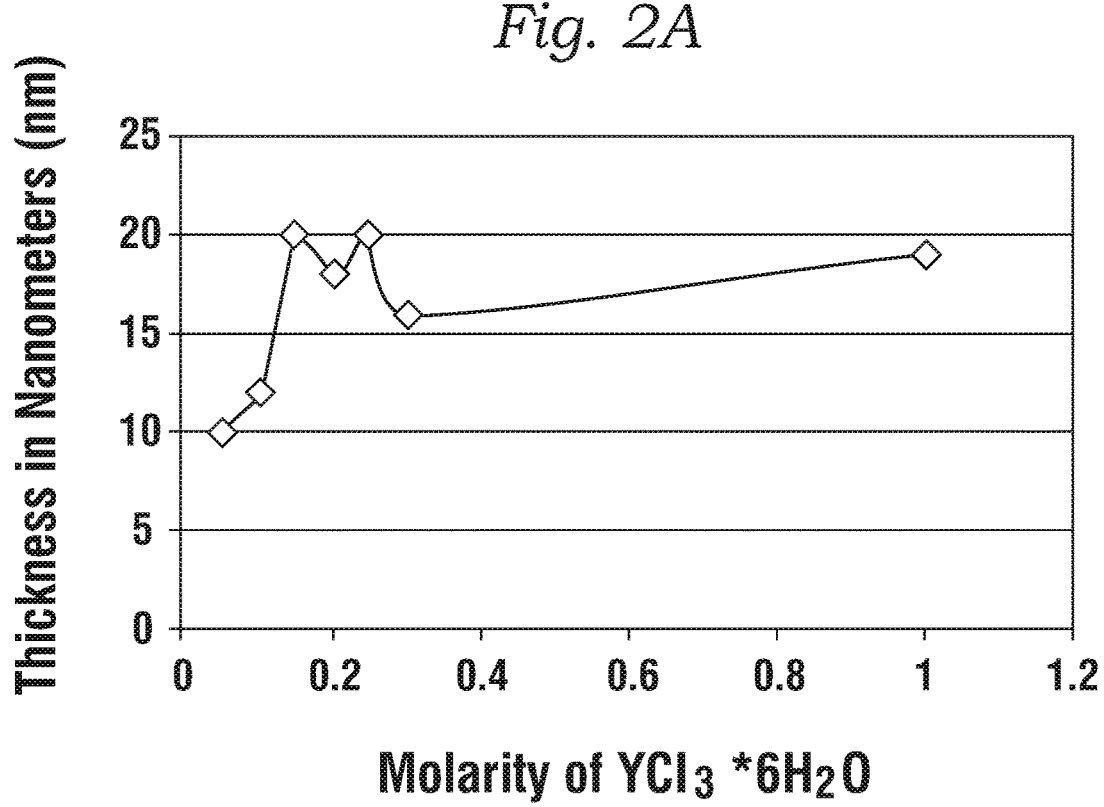
FIGS. 2A and 2B are graphs showing coating thickness as a function of reagent molarity and water-soluble polymer content in accordance with one embodiment.
Figure 2B:
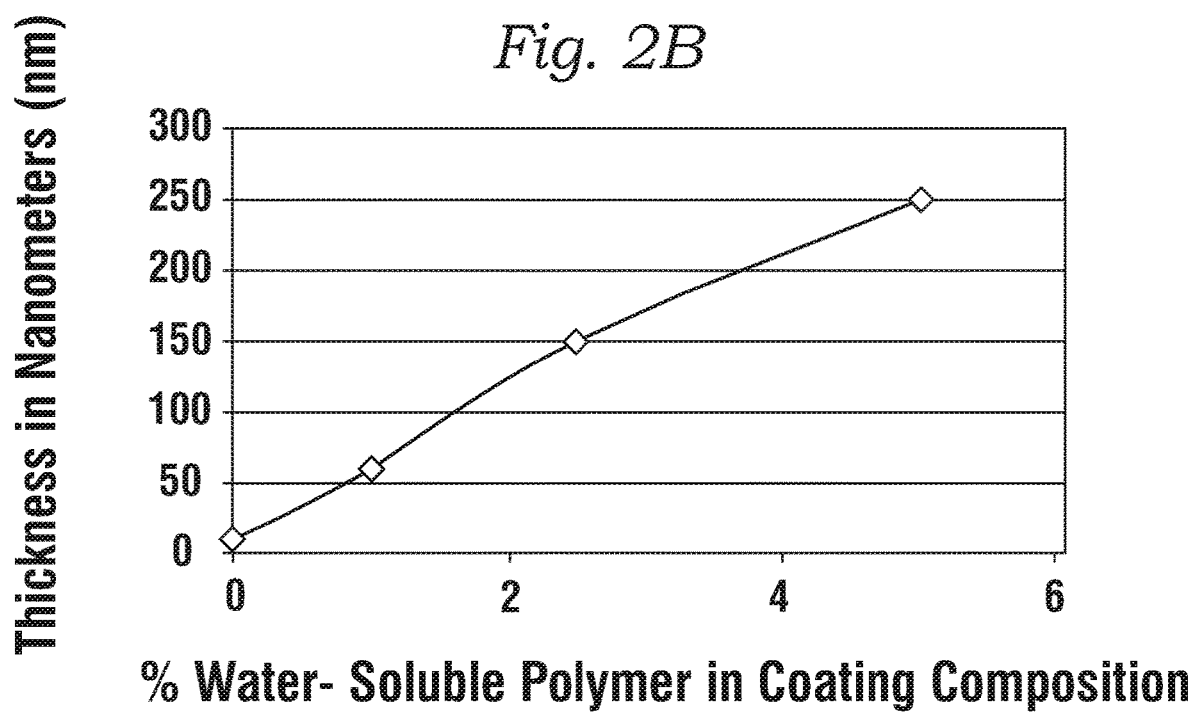

A preferred embodiment of the coating composition further comprises a water-soluble polymer. This water-soluble polymer component acts to increase the thickness of the final hydrophobic coating. The hydrophobic nature of the coating composition without the water-soluble polymer makes it resistant to generating high thickness. With reference to FIG. 2A, the final thickness of the resulting coating, without the addition of a water-soluble polymer, is limited to less than about 30 nm, which is too thin for robust performance in, for example, glass aircraft windows. With reference to FIG. 2B, the addition of a water-soluble polymer to the coating composition increases the final coating thickness to over about 50 nm, over about 75 nm, over about 100 nm, over about 125 nm, over about 150 nm, over about 200 nm, over about 225 nm, or over about 250 nm. Each feature or concept is independent, but can be combined with any other feature or concept disclosed in this application.

In one embodiment, the water-soluble polymer is selected from the group consisting of poly(n-vinylpyrrolidone), poly(vinylamine) hydrochloride, polymethacrylamide, polyvinyl alcohol, polyacrylamide, poly(ethylene oxide-b-propylene oxide), poly(methacrylic acid), poly(ethylene oxide), poly(n-iso-propylacrylamide), and poly(2-vinylpyridine). In a further embodiment, the water-soluble polymer is polyvinyl alcohol. In one embodiment, the water-soluble polymer is from about 1% to about 10% by weight of the coating composition. In yet another embodiment, the water-soluble polymer is from about 1% to about 5% by weight of the coating composition. Each feature or concept is independent, but can be combined with any other feature or concept disclosed in this application.

A preferred embodiment of the coating composition further comprises a solvent solution of de-ionized water and a water-soluble alcohol. In one embodiment, the water-soluble alcohol is selected from the group consisting of isopropyl alcohol, methanol, ethanol, propanol, and butanol. The table below provides the chemical formulas and the water solubility levels of some water-soluble alcohols, but any other water-soluble alcohol may be used. In another preferred embodiment, the de-ionized water and water-soluble alcohol are present in the solvent solution in a ratio of about 2:1. Each feature or concept is independent, but can be combined with any other feature or concept disclosed in this application.

| Compound | Formula | Solubility In Water |
|---|---|---|
| Isopropyl Alcohol | $C_3H_8O$ | Miscible |
| Methanol | $CH_3OH$ | Miscible |
| Ethanol | $CH_3CH_2OH$ | Miscible |
| Propanol | $CH_3(CH_2)_2OH$ | Miscible |
| Butanol | $CH_3(CH_2)_3OH$ | 9 g/100 mL |

With reference to FIG. 1C, in one embodiment, the method further comprises the step 100 of preparing the coating composition. In one embodiment, the preparing step comprises dissolving a yttrium compound, a water-soluble polymer, and an additive selected from the group consisting of a cerium compound and a dispersion of yttrium oxide, in a solvent solution of de-ionized water and a water-soluble alcohol.

In one embodiment, the method comprises the step 110 of applying the coating composition to the surface by an application method selected from the group consisting of flowing, dipping, and spraying. The selection of the appropriate method, or combination of methods, is commonly understood by one of ordinary skill in the art. For example, a flow or spray coating may be appropriate for large parts or complex shapes, or when two different coatings are required. Dip coating may be appropriate, for example, where an entire part is to be coated.

With reference again to FIGS. 1B and 1C, in one embodiment, the method further comprises the step 120 of allowing the coating composition on the surface of the substrate to dry before heating. In an alternative embodiment, method comprises the step of drying the coating composition on the surface of the substrate before heating. In either case, the coating composition can be allowed to dry for about 1 hour, about 2 hours, about 3 hours, or until the coating composition is in the "green state."

In one embodiment, the method comprises the step 130 of heating the coated surface at a cure temperature from about 450° C. to about 600° C. for a time from about 8 hours to about 48 hours. In one embodiment, the time is from about 12 hours to about 24 hours. In a preferred embodiment, the cure temperature is about 450° C. and the time is about 24 hours.

In another embodiment, the method comprises the step 130 of heating the coated surface at a cure temperature from about 300° C. to about 500° C. for a time from about 2 hours to about 5 hours. In a more particular embodiment, the cure temperature is between approximately 300° C. to 400° C. and the cure time is between approximately 2 to 3 hours. In a preferred embodiment, the cure temperature is about 300° C. and the time is about 2 hours.

In a further embodiment, the heating step 130 comprises ramping the temperature from a start temperature to the cure temperature at one or more ramp rates. For example, a ramp rate can be chosen to allow for slow out-gassing of carbonaceous byproducts without bubble formation or development of coating hazing. Once most of the compounds are removed, the ramp rate can be increased until the cure temperature is reached.

Another example is embodied in a method of applying a hydrophobic coating to a glass surface. In one embodiment, the method includes applying a coating composition to the surface and heating the coated surface at a cure temperature from about 300° C. to about 600° C. for a time from about 2 hours to about 48 hours. In a more particular embodiment, the cure temperature is from about 450° C. to about 600° C. and the cure time is from about 12 hours to about 48 hours. The coating composition is applied to the surface by an application method selected from the group consisting of flowing, dipping, and spraying. The coating composition comprises a yttrium compound, a cerium compound, a water-soluble polymer, and a solvent solution of de-ionized water and a water-soluble alcohol. The cerium compound is from about 0.3% to about 0.6% weight of the coating composition, the water-soluble polymer is from about 1% to about 5% by weight of the coating composition; and the de-ionized water and water-soluble alcohol are present in the solvent solution in a ratio of about 2:1.

In one embodiment, the yttrium compound is selected from the group consisting of yttrium acetate, yttrium carbonate, yttrium chloride, yttrium fluoride, yttrium hydroxide, yttrium metal, yttrium nitrate, yttrium oxalate, and yttrium sulfate. In one embodiment, the cerium compound is selected from the group consisting of cerium acetate, cerium bromide, cerium chloride, cerium nitrate, and cerium sulfate. In a further embodiment, the water-soluble polymer is selected from the group consisting of poly(n-vinylpyrrolidone), poly(vinylamine) hydrochloride, polymethacrylamide, polyvinyl alcohol, polyacrylamide, poly(ethylene oxide-b-propylene oxide), poly(methacrylic acid), poly(ethylene oxide), poly(n-iso-propylacrylamide), and poly(2-vinylpyridine). In yet another embodiment, the water-soluble alcohol is selected from the group consisting of isopropyl alcohol, methanol, ethanol, propanol, and butanol.

In one embodiment, the yttrium compound is yttrium acetate. In an additional embodiment, the cerium compound is cerium chloride. In a further embodiment, the water-soluble polymer is polyvinyl alcohol. In another embodiment, the water-soluble alcohol is isopropyl alcohol. In yet another embodiment, the cure temperature is about 450° C. and the time is about 24 hours.

Another example is embodied in a method of applying a hydrophobic coating to a glass surface. In one embodiment, the method includes applying a coating composition to the surface and heating the coated surface at a cure temperature from about 300° C. to about 500° C. for a time from about 2 hours to about 5 hours. The coating composition is applied to the surface by an application method selected from the group consisting of flowing, dipping, and spraying. The coating composition comprises a yttrium compound, a dispersion of yttrium oxide nanoparticles, a water-soluble polymer, and a solvent solution of de-ionized water and a water-soluble alcohol. The dispersion of yttrium oxide nanoparticles is from about 0.5% to about 1% by weight of the coating composition, the water-soluble polymer is from about 1% to about 5% by weight of the coating composition; and the de-ionized water and water-soluble alcohol are present in the solvent solution in a ratio of about 2:1.

In one embodiment, the yttrium compound is selected from the group consisting of yttrium acetate, yttrium carbonate, yttrium chloride, yttrium fluoride, yttrium hydroxide, yttrium metal, yttrium nitrate, yttrium oxalate, and yttrium sulfate. In an additional embodiment, the water-soluble polymer is selected from the group consisting of poly(n-vinylpyrrolidone), poly(vinylamine) hydrochloride, polymethacrylamide, polyvinyl alcohol, polyacrylamide, poly(ethylene oxide-b-propylene oxide), poly(methacrylic acid), poly(ethylene oxide), poly(n-iso-propylacrylamide), and poly(2-vinylpyridine). In a further embodiment, the water-soluble alcohol is selected from the group consisting of isopropyl alcohol, methanol, ethanol, propanol, and butanol.

In one embodiment, the yttrium compound is yttrium acetate. In another embodiment, the water-soluble polymer is polyvinyl alcohol. In a further embodiment, the water-soluble alcohol is isopropyl alcohol. In an additional embodiment, the cure temperature is about 300° C. and the time is about 2 hours.

It should be appreciated from the foregoing description that the present invention provides a scalable method of applying a hydrophobic coating that exhibits environmentally robust hydrophobicity. Coatings produced by these methods are hydrophobic; optically transparent; and resistant to environmental degradation, mechanical abrasion, repeated stress, and attack by acids and bases. In addition, the coatings are thick enough for robust performance and the cure temperature is within the safe limits of glass substrate melting and, in some embodiments, de-tempering. For all of these reasons, the methods described herein, and the resulting coatings, are ideal for aircraft and automotive transparency applications.

Specific methods, devices, and materials are described, although any methods and materials similar or equivalent to those described can be used in the practice or testing of the present embodiment. Unless defined otherwise, all technical and scientific terms used herein have the same meanings as commonly understood by one of ordinary skill in the art to which this embodiment belongs.

As used herein, the term "water-soluble" means the compound is infinitely soluble in water, very soluble in water, freely soluble in water, or soluble in water, as these terms are commonly understood. A material is generally considered "very soluble" if about 1 gram of material requires about 1 milliliter or less of solute to dissolve. A material is generally considered "freely soluble" if about 1 gram of material requires about 1 milliliter to about 10 milliliters of solute to dissolve. A material is generally considered "soluble" if about 1 gram of material requires about 10 milliliters to 30 milliliters of solute to dissolve. A material is generally considered "sparingly soluble" if about 1 gram of material requires about 30 milliliters to about 100 milliliters of solute to dissolve.

Without further elaboration, it is believed that one skilled in the art, using the proceeding description, can make and use the present invention to the fullest extent. Other objectives, features, and advantages of the present embodiments will become apparent from the following specific examples. The specific examples, while indicating specific embodiments, are provided by way of illustration only. Accordingly, the present invention also includes those various changes and modifications within the spirit and scope of the invention that may become apparent to those skilled in the art from this detailed description. The following examples are illustrative only, and are not limiting of the disclosure in any way whatsoever. Each feature or concept described in each example is independent, and can be combined with any other feature or concept disclosed in this application.

Example 1

A glass surface was coated with about 5 grams of yttrium acetate dissolved in 200 mL of a 1:2 co-solvent mixture of isopropyl alcohol and de-ionized water. The coated glass substrate was allowed to dry for about 2 hours before being thermally treated at about 500° C. for about 12 hours in ambient atmosphere.

There is a consensus in the scientific literature that yttrium oxide crystallization proceeds very slowly at temperatures less than 550° C., which is higher than the cure temperature used in this example and beyond the material limits (melting and de-tempering points) of the glass substrate. X-ray diffraction measurements of the coated glass showed peaks consistent with the hydrophobic phase of yttrium oxide. The high peak broadness suggested that, as expected, the yttrium oxide coating was partially amorphous, requiring higher temperatures or longer durations for full cure.

The resulting coating thickness did not typically exceed 20 nm with this process. With reference to FIG. 2A, further increases in coating solution molarity, up to the maximum reagent solubility, did not produce an appreciable increase in final coating thickness. This limitation in thickness is thought to be due to the inherent hydrophobicity of the coating interfering with film nucleation and growth at the surface.

The performance of coatings in this example was somewhat variable. Some regions of coated glass showed hydrophobicity, with water contact angles larger than 60°, while other regions showed lower water contact angles more consistent with the glass surface. Considering this, and that the coating thickness is less than the root mean square (RMS) roughness of the glass substrate, complete coverage of the surface had not been achieved.

Example 2

About 5 grams of yttrium acetate was dissolved in 300 mL of a 1:2 co-solvent mixture of isopropyl alcohol and de-ionized water and coating composition was doped with about 1% polyvinyl alcohol (PVA) by weight of the coating composition. The PVA readily dissolved in the coating composition and acted to increase its viscosity. The PVA further improved wetting conditions at the surface, which promoted a thicker coating front and increased final wet coating thickness. The PVA-based matrix allowed for higher rare earth atom content at the surface and considerably thicker coatings. After about 2 hours of dry time, the coated substrates were cured at about 500° C. for about 12 hours in an ambient atmosphere. The resulting thickness, determined by surface profilometry, was over 50 nm, far exceeding the 20 nm limit of Example 1.

Example 3

A coating composition was prepared as in Example 2, except PVA content in the coating composition was increased to about 2.5% by weight of the coating composition. After about 2 hours of dry time, the coated substrates were cured at about 500° C. for about 12 hours in an ambient atmosphere. With reference to FIG. 2B, this process resulted in coating thicknesses greater than about 150 nm.

Example 4

A coating composition was prepared as in Example 2, except PVA content in the coating composition was increased to about 5% by weight of the coating composition. After about 2 hours of dry time, the coating substrates were cured at about 500° C. for about 12 hours in an ambient atmosphere. With reference again to FIG. 2B, this process resulted in coating thicknesses of about 250 nm.

Example 5

A coating composition was prepared as in Example 2 and doped with cerium chloride in an amount ranging from about 0.00% to about 1% by weight of the coating composition. After about 2 hours of dry time, the coating substrates were cured at about 450° C. to about 500° C. for about 8 hours to about 48 hours in an ambient atmosphere.

The table below illustrates the effect the cerium compound had on the water contact angle when the coating was heated at a cure temperature of about 450° C. for a time of about 12 hours. As is shown, the contact angle changed from 36°, with no cerium, to 78°, with from about 0.4% to about 0.5% cerium. This is due to the low temperature generation of cerium oxide crystallites, which act as nucleation sites for yttrium oxide. Therefore, crystallization of the hydrophobic yttrium oxide phase is promoted and the necessary cure temperature is lowered.

| % Cerium By Weight | % Cerium $Y_2O_3$:Ce | Water Contact Angle |
| --- | --- | --- |
| 0.00% | 0% | 36° |
| 0.02% | 1% | 44° |
| 0.07% | 3% | 41° |
| 0.11% | 5% | 59° |
| 0.16% | 7% | 62° |
| 0.23% | 10% | 60° |
| 0.27% | 12% | 64° |
| 0.32% | 14% | 64° |
| 0.37% | 16% | 77° |
| 0.41% | 18% | 71° |
| 0.46% | 20% | 78° |

The table below shows the same effect, although enhanced, for coatings cured at about 475° C. for a time of about 12 hours. These achieved water contact angles exceeding 80°.

| % Cerium By Weight | % Cerium $Y_2O_3$:Ce | Water Contact Angle |
| --- | --- | --- |
| 0.23% | 10% | 51° |
| 0.27% | 12% | 57° |
| 0.32% | 14% | 64° |
| 0.37% | 16% | 71° |
| 0.41% | 18% | 78° |
| 0.46% | 20% | 85° |

Example 6

The coating composition from Example 3 was doped with cerium chloride in an amount from about 0.2% to about 0.7% by weight of the coating composition. After about 2 hours of dry time, cure temperature and duration were selected to maximize the crystallinity of the hydrophobic ceramic coating, thereby boosting water contact angle, while minimizing potential degradation of the tempered glass substrate.

The tables below show the relationship between water contact angle and cure temperature and time. As is evident, modest cure temperatures can be used with longer duration. The maximum hydrophobicity and water contact angle, measuring about 105°, was achieved with a cerium content from about 0.4% to about 0.5% by weight of the coating composition, and a cure temperature of about 450° C. for a time of about 24 hours. This corresponded to a coating composition comprising about 3.69 grams of yttrium acetate and about 1.31 grams of cerium chloride dissolved in a 2:1 co-solvent solution of de-ionized water to isopropyl alcohol with about 2.5% PVA by weight of the coating composition. This coating composition exhibited high density in the hydrophobic crystal phase, high crystallinity, and a surface morphology with an appropriate degree of RMS roughness. Longer cure times did not result in any further increase in the observed water contact angle.

| 450° C. for 24 Hours | |
| --- | --- |
| % Cerium | Angle |
| 0.23% | 85° |
| 0.27% | 85° |
| 0.32% | 95° |
| 0.37% | 95° |
| 0.41% | 95° |
| 0.46% | 105° |
| 0.50% | 95° |
| 0.55% | 95° |
| 0.60% | 85° |
| 0.64% | 85° |

| 450° C. for 8 Hours | |
| --- | --- |
| % Cerium | Angle |
| 0.23% | 60° |
| 0.27% | 64° |
| 0.32% | 64° |
| 0.37% | 77° |
| 0.41% | 71° |
| 0.46% | 78° |
| 0.50% | 64° |
| 0.55% | 71° |
| 0.60% | 64° |
| 0.64% | 78° |

| 450° C. for 16 Hours | |
| --- | --- |
| % Cerium | Angle |
| 0.23% | 85° |
| 0.27% | 77° |
| 0.32% | 85° |
| 0.37% | 85° |
| 0.41% | 85° |
| 0.46% | 71° |
| 0.50% | 71° |
| 0.55% | 85° |
| 0.60% | 71° |
| 0.64% | 71° |

The performance of water contact angle and rain shedding was also performed. The coated glass produced water contact angles greater than about 100° and minimal optical distortion due to impinging rain.

Although the addition of a cerium compound to the coating composition allowed for a feasible coating process for glass, it did introduce a reduction in mechanical hardness. The mixed oxide Y2O3:Ce coatings displayed greater hardness and scratch resistance than glass, but high cerium content softened the yttrium oxide coating. The following alternative strategy was considered to achieve closer to the maximum hardness inherent in pure yttrium oxide.

Example 7

The coating composition from Example 2 was doped with a water-based colloidal suspension of yttrium oxide nanoparticles in an amount from about 0% to about 1% by weight. The colloidal dispersion of yttrium oxide nanoparticles were introduced to substitute for the cerium compound in the coating composition. The colloid is compatible with the existing coating composition and can be added to high levels without precipitation. The resulting water contact angle increased from about 71°, with no yttrium oxide nanocrystals, to about 90°, with the addition about 0.5% of the colloidal suspension; and up to about 99° with about 1% of the colloidal suspension.

With reference to FIG. 3, these yttrium oxide nanoparticles promote nucleation and crystal growth of the hydrophobic phase of interest and further suppress the necessary cure temperature. As the coating composition is heated, the yttrium oxide nanoparticles act as "seeds" for the developing yttrium oxide crystals. In other words, with the dispersion of yttrium oxide nanoparticles, yttrium and oxygen ions in the solution can easily find sites on the nanoparticles and create further layers of hydrophobic crystalline material. Without the nanoparticle seeds, the dissolved ions would face a nucleation barrier that can only be overcome through the addition of thermal energy and increased cure temperature. Thus, the dispersion of yttrium oxide nanoparticles effectively lowers the barrier for nucleation, allowing crystallization to occur at reduced temperatures compared to with pure yttrium.

Using this strategy, cerium chloride can be replaced with the yttrium oxide colloid to partial or full extent. The hydrophobic oxide crystal phase will encounter "seed" sites on the colloid crystallites with appropriate lattice parameters and electronic environment.

Example 8

A water-based colloidal suspension of yttrium oxide nanoparticles in an amount from about 0% to about 1% by weight was added to the coating composition from Example 2. The colloidal dispersion of yttrium oxide nanoparticles served to substitute for the cerium compound in the coating composition. The colloid is compatible with the existing coating composition and can be added to high levels without precipitation. Substrates were coated by spray and flow methods before a thermal cure at 300° C. for 2 hours. The resulting water contact angle was over 90°, with the addition about 0.67% of the colloidal suspension; and nearly 100° with about 1% of the colloidal suspension. The 300° C. cure temperature necessary to crystallize the coating with the nanoparticles is greatly reduced from 450° C., the temperature required to fully crystallize yttrium oxide with cerium addition. As such, in certain embodiments, the nanoparticle nucleation method may be a preferable technique to suppress crystallization temperature.

The invention has been described in detail with reference only to the presently preferred embodiments. Persons skilled in the art will appreciate that various modifications can be made without departing from the invention. Accordingly, the invention is defined only by the following claims.

The invention claimed is:

1. A method of applying a hydrophobic coating to a surface of a substrate, the method comprising the following steps:
    applying a coating composition to the surface by an application method selected from the group consisting of flowing, dipping, and spraying; and
    heating the coated surface at a cure temperature from about 300° C. to about 500° C. for a time from about 2 hours to about 48 hours; and
    wherein the coating composition comprises:
        a yttrium compound,
        a dispersion of yttrium oxide nanoparticles,
        a water-soluble polymer, and
        a solvent solution of de-ionized water and a water-soluble alcohol.
2. The method of claim 1, wherein the substrate is glass.
3. The method of claim 1, wherein the cure temperature is from about 450° C. to about 500° C.
4. The method of claim 1, wherein the time is from about 12 hours to about 24 hours.
5. The method of claim 1, further comprising the step of drying the coating composition on the surface of the substrate before heating.
6. The method of claim 1, wherein the heating step comprises ramping from a start temperature to the cure temperature at one or more ramp rates.
7. The method of claim 1, wherein the yttrium compound is selected from the group consisting of yttrium acetate, yttrium carbonate, yttrium chloride, yttrium fluoride, yttrium hydroxide, yttrium metal, yttrium nitrate, yttrium oxalate, and yttrium sulfate.
8. The method of claim 7, wherein the yttrium compound is yttrium acetate.
9. The method of claim 1, wherein the dispersion of yttrium oxide nanoparticles is in an amount ranging from about 0.1% to about 5% by weight of the coating composition.
10. The method of claim 9, wherein the amount of the dispersion of yttrium oxide nanoparticles is from about 0.5% to about 1% by weight of the coating composition.
11. The method of claim 1, wherein the water-soluble polymer is selected from the group consisting of poly(n-vinylpyrrolidone), poly(vinylamine) hydrochloride, polymethacrylamide, polyvinyl alcohol, polyacrylamide, poly(ethylene oxide-b-propylene oxide), poly(methacrylic acid), poly(ethylene oxide), poly(n-iso-propylacrylamide), and poly(2-vinylpyridine).
12. The method of claim 11, wherein the water-soluble polymer is polyvinyl alcohol.
13. The method of claim 11, wherein the amount of the water-soluble polymer is from about 1% to about 5% by weight of the coating composition.
14. The method of claim 1, wherein the water-soluble alcohol is selected from the group consisting of isopropyl alcohol, methanol, ethanol, propanol, and butanol.
15. The method of claim 1, wherein the water-soluble alcohol is isopropyl alcohol.
16. The method of claim 1, wherein de-ionized water and water-soluble alcohol are present in the solvent solution in a ratio of about 2:1.

* * * * *